UNITED STATES PATENT OFFICE.

DAVID KENNEDY, OF READING, PENNSYLVANIA.

IMPROVEMENT IN TANNING.

Specification forming part of Letters Patent No. 9,406, dated November 16, 1852.

*To all whom it may concern:*

Be it known that I, DAVID KENNEDY, of Reading, in the county of Berks and State of Pennsylvania, have discovered a new and useful composition of matter which is applicable as a substitute for bark in the process of tanning leather; and I do hereby declare that the following is a full, clear, and exact description of the manner of compounding and using the same.

This chemical process consists in the mixture of acacia catechu with nitrate of potassa or other nitrates of the same nature, alum, biborate of soda or borax, and water, which may be mixed in various proportions. I have, however, found the following proportions of the ingredients to answer very well in the manufacture of the compound, viz: twelve pounds of terra-japonica dissolved in four gallons of boiling water; one pound of niter or saltpeter dissolved in one quart of boiling water; a half-pound of alum dissolved in one quart of boiling water; a half-pound of borax dissolved in one quart of boiling water, which ingredients, when separately dissolved and then mixed, are then fit for use in the vat or tub; or they may be stored up in barrels or other vessels.

This compound possesses a large quantity of tannic acid, and is therefore useful in tanning leather, the same as bark is now used.

Some of the materials employed in the above-described composition may be replaced by others possessing similar properties—as, for instance, instead of terra-japonica other gambiers may be used, (such as *Nauclea gambir*,) and so with the others—so that the compound would not be essentially changed in its character by such substitution or replacement. I do not therefore intend to limit myself to the precise ingredients above enumerated, but contemplate varying both the articles themselves and the proportions in which they are combined as economy in their cost or adaptation to particular circumstances may render expedient.

Having thus described the manner in which my chemical compound for tanning is compounded and used, what I claim as my invention, and desire to secure by Letters Patent, is—

The use of borax, in combination with niter, alum, and terra-japonica in solutions of tannin, substantially as and for the purposes herein set forth.

The property of the borax I have found of essential use in raising the hides in the tanning process, and preparing it without injury for speedy and safe tanning.

In testimony whereof I have set my hand this 27th day of October, A. D. 1852.

DAVID KENNEDY.

In presence of—
W. R. SPEER,
ANDREW CAMPBELL.